United States Patent
Takayama et al.

(10) Patent No.: US 8,368,943 B2
(45) Date of Patent: Feb. 5, 2013

(54) IMAGE CREATING APPARATUS AND PRINTING APPARATUS PROVIDED THEREWITH

(75) Inventors: Shoji Takayama, Azumino (JP); Takayuki Uehara, Koshigaya (JP)

(73) Assignees: Seiko Epson Corporation, Tokyo (JP); Kim Jim Co., Ltd., Tokyo (JP)

( * ) Notice: Subject to any disclaimer, the term of this patent is extended or adjusted under 35 U.S.C. 154(b) by 1200 days.

(21) Appl. No.: 11/671,965

(22) Filed: Feb. 6, 2007

(65) Prior Publication Data

US 2007/0195337 A1 Aug. 23, 2007

(30) Foreign Application Priority Data

Feb. 22, 2006 (JP) ................................. 2006-045704

(51) Int. Cl.
*G06K 15/02* (2006.01)
*G06F 3/12* (2006.01)
*G06F 15/00* (2006.01)
*G06F 17/00* (2006.01)

(52) U.S. Cl. ...... 358/1.18; 358/1.2; 358/1.11; 358/1.13; 358/1.14; 358/1.15; 358/1.16; 715/222; 715/223; 715/224; 715/225; 715/252; 715/253

(58) Field of Classification Search .................. None
See application file for complete search history.

(56) References Cited

U.S. PATENT DOCUMENTS

| 5,496,119 | A | * | 3/1996 | Kawakami et al. | ............. 400/70 |
| 6,906,812 | B2 | | 6/2005 | Koakutsu et al. | |
| 2002/0114006 | A1 | * | 8/2002 | Matoba | ......................... 358/1.15 |
| 2005/0012949 | A1 | * | 1/2005 | Kitahara et al. | ............. 358/1.11 |
| 2005/0201796 | A1 | * | 9/2005 | Arkin | ............................... 400/76 |
| 2006/0072779 | A1 | * | 4/2006 | Erol | ............................... 382/100 |
| 2006/0149810 | A1 | * | 7/2006 | Koo et al. | ..................... 709/203 |

FOREIGN PATENT DOCUMENTS

| JP | 2001293909 A | 10/2001 |
| JP | 2002264424 A | 9/2002 |
| JP | 2003-084950 | 3/2003 |

OTHER PUBLICATIONS

Higuchi et al.; "Bar Code Printing . . . For Bar code Printing System"; JP Pub Date Jul. 1999; Machine translation in english for JP Pub No. 11-203379.*

* cited by examiner

*Primary Examiner* — Benny Q Tieu
*Assistant Examiner* — Haris Sabah
(74) *Attorney, Agent, or Firm* — DLA Piper LLP (US)

(57) ABSTRACT

There is provided an image creating apparatus including: an inputting device for inputting creation data composed of input data and creation condition data; an image creating device for creating a two-dimensional code image based on the inputted creation data; and an informing device for informing of a print size of the created two-dimensional code image, wherein the image creating device creates the two-dimensional code image based on the creation data being inputted, in the process of inputting the creation data by the inputting device, and the informing device informs of the print size of the two-dimensional code image created by the image creating device based on the creation data being inputted.

9 Claims, 8 Drawing Sheets

IMAGE CREATING APPARATUS AND PRINTING APPARATUS PROVIDED THEREWITH

The entire disclosure of Japanese Patent Application No. 2006-045704, filed Feb. 22, 2006, is expressly incorporated by reference herein.

BACKGROUND

1. Technical Field

The present invention relates to an image creating apparatus which creates a two-dimensional code image and a printing apparatus provided therewith.

2. Related Art

A known printing apparatus is of a type which creates character images based on inputted characters, figures, or the like, as well as a two-dimensional code image such as a OR-code image based on creation data, to print these created images on a print object. Reference is made to JP-A-2003-84950 as an example of related art. With this type of printing apparatus, a two-dimensional code image and character images can be freely arranged and printed within a printable area provided in a label sheet as a print object. In this case, the print size thereof may be changed according to the amount of input data and the setting result of creation conditions (in short referred to as "creation data") in consideration of the reading of the two-dimensional code image.

With the above-described printing apparatus, however, it is not possible for the user to previously identify the print size of the two-dimensional code image in the process of inputting the creation data, with the result that the print result size of the two-dimensional code image could become larger than that of the label sheet. Accordingly, the adjustment of the amount of the input data and the setting of the creation conditions have had no other choice than depending on the print result, and the operation of printing the two-dimensional code image on the label sheet or the like having limited printing space has been unavoidably cumbersome.

SUMMARY

It is an advantage of the invention to provide an image creating apparatus and a printing apparatus capable of efficiently creating a two-dimensional code image of a desired print size.

According to one aspect of the invention, there is provided an image creating apparatus. The image creating apparatus comprises: an inputting device for inputting creation data composed of input data and creation condition data; an image creating device for creating a two-dimensional code image based on the inputted creation data; and an informing device for informing of a print size of the created two-dimensional code image, wherein the image creating device creates the two-dimensional code image based on the creation data being inputted, in the process of inputting the creation data by the inputting device, and the informing device informs of the print size of the two-dimensional code image created by the image creating device based on the creation data being inputted.

In this case, it is preferable that the image creating apparatus further comprise a storing device for storing an existing creating data, wherein the inputting device is configured to edit the creation data read out from the storing device.

According to this configuration, even if the existing creation data stored as a format or the existing creation data stored in a file is read, it is possible for the user to see the print size of a two-dimensional code image immediately.

In this case, it is preferable that the informing device inform in real time of the print size of the two-dimensional code image created along with the creation data being inputted, in the process of inputting the creation data.

According to this configuration, it is possible for the user to see in real time the print size of the two-dimensional code image created based on the creation data in the process of inputting the creation data. That is, it is possible for the user to perform an inputting operation while identifying the print size. Therefore, the user can adjust the amount of input data and set creation conditions in consideration of a desired print size, with the result that the two-dimensional code image can be efficiently created. Note that, taking the creation of the QR-code image as an example, the input data of the creation data represents data to be stored in the two-dimensional code image or the like, and the creation condition data thereof represents an error correction rate, a cell size, or the like. Furthermore, the informing device may inform of a print size by means of voice or the like, in addition to screen display. Moreover, the inputting device may be configured such that the inputting is made not only by key entry through the keyboard but also by reading existing data through key operation.

In this case, it is preferable that the informing device convert the print size of the two-dimensional code image into a font size of a character image previously stored and inform that the same is a conversion font size.

According to this configuration, the print size is indicated by a commonly-used font size such as a point (point size), thereby making it possible for the user to easily see (image) the print size of the two-dimensional code image which will actually be printed. Furthermore the print size is informed as a font size, thereby making it possible to simplify size information and easily arrange the two-dimensional code image and the character image.

In this case, it is preferable that the informing device inform of both the conversion font size and an apparatus's maximum font size which is the maximum font size out of stored font sizes.

According to this configuration, both the conversion font size and the apparatus's maximum font size can be informed by the indicators, thereby making it possible to inform the user of the fact that the conversion font size exceeds the apparatus's maximum font size.

In this case, it is preferable that the informing device inform that the conversion font size exceeds the apparatus's maximum font size which is the maximum font size out of the stored font sizes.

In this case, it is preferable that the informing device inform of both the conversion font size and a print object's maximum font size in which it is possible to perform printing on a print object with the print size of the two-dimensional code image.

According to this configuration, both the conversion font size and the print object's maximum font size can be informed by the indicators, thereby making it possible to inform the user of the fact that the conversion font size exceeds the print object's maximum font size.

In this case, it is preferable that the informing device inform that the conversion font size exceeds the print object's maximum font size in which it is possible to perform printing on a print object with the print size of the two-dimensional code image.

According to another aspect of the invention, there is provided a printing apparatus comprising: the image creating apparatus as described above; and a printing device for printing the two-dimensional code image created by the image creating apparatus.

According to this configuration, it is possible to provide the image creating apparatus and the printing apparatus which make it possible to create a two-dimensional code image of a desired print size in the process of the inputting.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, referring to the accompanying drawings, a description will be made about a printing apparatus provided with an image creating apparatus according to the embodiment. The printing apparatus is the so-called tape printer, which creates a two-dimensional code image, character images, or the like based on creation data, prints the same on a print tape, and cuts off the printed part thereof, so as to create a label.

Figure 1:
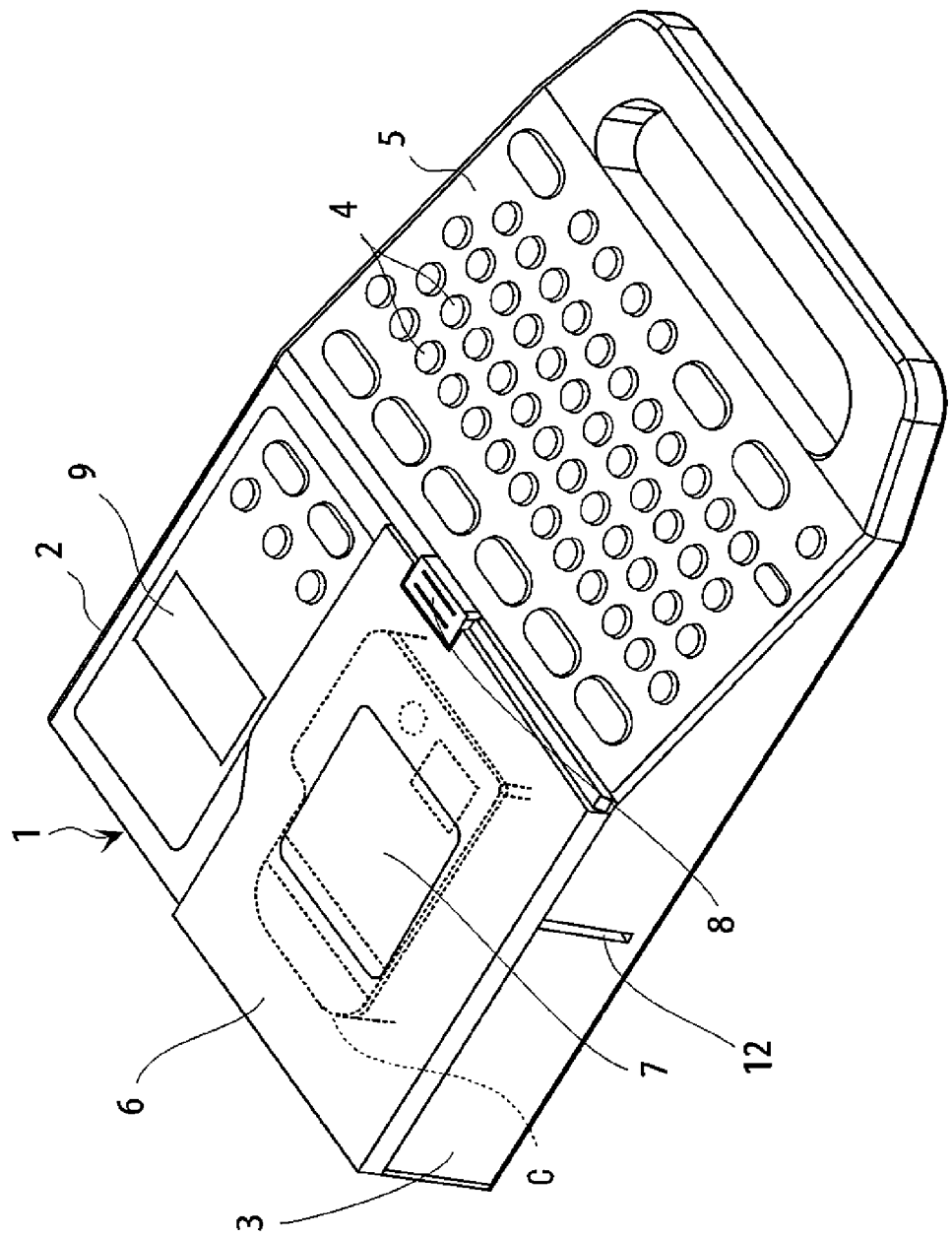
FIG. 1 is an external perspective view of a tape printer according to the embodiment with its lid closed.
Figure 2:
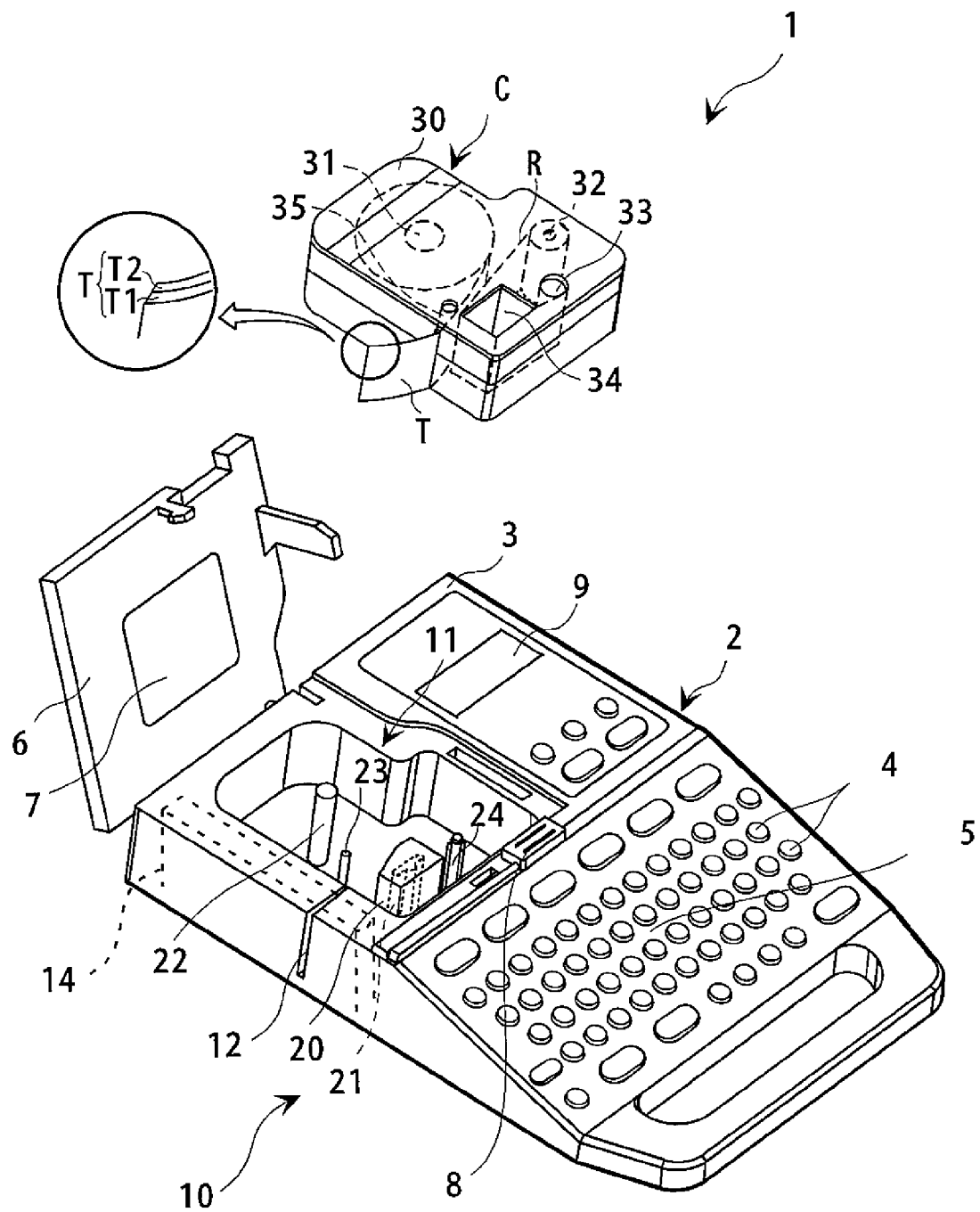
FIG. 2 is an external perspective view of the tape printer according to the embodiment with its lid opened.

As shown in FIGS. 1 and 2, the tape printer 1 has an apparatus main body 2 which performs a printing process on the print tape T and a tape cartridge C accommodating the print tape T and an ink ribbon R and detachably mounted on the apparatus main body 2.

The apparatus main body 2 has an outer shell formed by an apparatus casing 3 in which a print processing section 10 is widely arranged. The apparatus casing 3 has a keyboard 5 including various keys 4 disposed at the top surface on the front-half side thereof. At the top surface on the left rear-half side of the apparatus casing 3 is widely provided an opening and closing lid 6. At the top surface of the opening and closing lid 6 is provided a check window 7 for discriminating mounting/non-mounting state of the tape cartridge C. At the front side of the opening and closing lid 6 is provided a lid opening button 8 for opening the same. At the top surface on the right rear-half side is provided a rectangular display 9 for displaying results or the like inputted from the keyboard 5.

Inside the opening and closing lid 8 is provided a recessed cartridge mounting section 11 for receiving the tape cartridge C. In the cartridge mounting section 11 is disposed a print head 21 for performing a printing process on the print tape T reeled out from the tape cartridge C (see FIG. 2).

On the left side of the apparatus casing 3 is formed a tape ejecting slot 12 for communicating the cartridge mounting section 11 with the outside of the apparatus. The apparatus casing 3 includes a cutter unit 14 for cutting off the print tape T, which faces on the tape ejecting slot 12. The cutter unit 14 is disposed to face on the tape ejecting slot 12 and has a full cutter 15 driven by a motor (full-cutter motor 16) to cut off the print tape T like scissors (see FIG. 2).

Although omitted in the figures, on the right side of the apparatus casing 3 are formed a power supply port for supplying power and a connector for connecting to external apparatuses such as personal computers not shown. Furthermore, although omitted in FIGS. 1 and 2, the apparatus casing 3 has mounted therein a circuit board constituting a controlling section 45 (see FIG. 3) for comprehensively controlling the apparatus casing 2.

The cartridge mounting section 11 has a print head 21 having a heater element and covered with a head cover 20, a positioning boss 22 for positioning a tape reel 31 as will be described later, a platen driving shaft 23 for feeding the print tape T and the ink ribbon R of the tape cartridge C and placed opposite to the print head 21, and a take-up driving shaft 24 for taking up the ink ribbon R, all of which are projectingly provided therein. Furthermore, at the corner of the cartridge mounting section 11 is provided a tape discriminating sensor 25 (see FIG. 3) composed of a plurality of micro switches. In a bottom plate of the cartridge mounting section 11 are incorporated a print-feeding motor 26 (see FIG. 3) for driving the platen driving shaft 23 and the take-up driving shaft 24, a reduction gear train (not shown), or the like.

The tape cartridge C has a cartridge casing 30 in which are accommodated a tape reel 31 winding the print tape T, a ribbon feeding reel 32 winding the ink ribbon R, and a ribbon taking-up reel 33. The ribbon feeding reel 32 and the ribbon taking-up reel 33 are positioned on the right lower side of the cartridge casing 30. Furthermore, around the left lower side of the tape reel 31 is formed a through hole 34 into which the head cover 20 covering the print head 21 is inserted. Besides, at a position where the print tape T and the ink ribbon R overlap each other is arranged a platen roller 35 which is engaged with the platen driving shaft 23 and rotates therewith. On the rear surface of the cartridge casing C are formed a plurality of small holes for detection (not shown). A tape discriminating sensor 25 as will be described later discriminates the plurality of holes for detection so that the type of the print tape T can be discriminated.

When the tape cartridge C is mounted on the cartridge mounting section 11, the head cover 20, the positioning boss 22, the take-up driving shaft 24, and the platen driving shaft 23 are inserted into the through hole 34, the tape reel 31, the ribbon taking-up reel 33, and the platen roller 35, respectively. When the opening and closing lid 6 is closed in this state, the print head 21 and the platen roller 35 are successively brought into contact with each other and sandwich the print tape T and the ink ribbon R therebetween, to create a printing standby state. When printing is started, the platen driving shaft 23 and the take-up driving shaft 24 cyclically rotate, and the print head 21 performs a printing process while the print tape T and the ink ribbon R are fed. At the same time, the ink ribbon R fed out from the ribbon feeding reel 32 travels around walls of the through hole 34 and is taken up by the ribbon taking-up reel 33. The printed part of the process tape T is cut off by the full cutter 15, and the print tape T cut off is ejected to the outside from the tape ejecting slot 12.

The print tape T is composed of a recording tape T1 having an adhesive agent layer coated on the rear surface thereof and a peeling tape T2 affixed to the recording tape T1 with the adhesive agent layer. The user peels off the peeling tape T2 from a tape piece of the print tape T removed after the printing process and affixes the recording tape T1 to an object to be affixed.

The display 9 is composed of a dot-matrix-type liquid crystal display and has a display screen 37 on which display image data of, for example, 256 dots×81 dots can be displayed and a plurality of indicators 38 (informing device) for displaying various setting conditions or the like. The display 9 is used when the user inputs data through keyboard 5 to create and edit print images (image data) or when he/she identifies the result thereof or the like.

Figure 3:
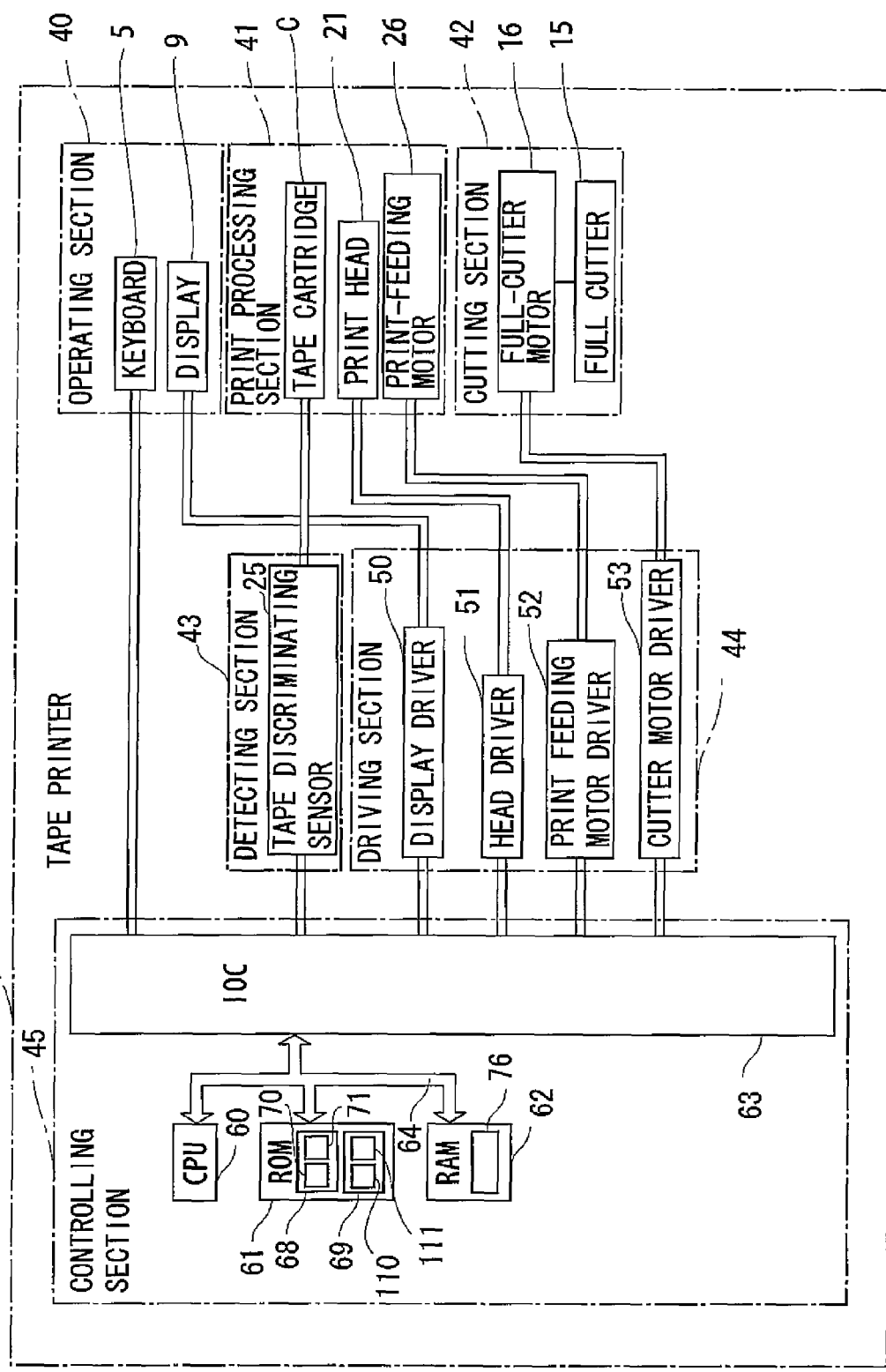
FIG. 3 is a control block diagram of the tape printer.

Referring next to FIG. 3, a description will be made about a construction of the control system of the tape printer 1. The tape printer 1 is composed of an operating section 40, a print processing section 41, a cutting section 42, a detecting section 43, a driving section 44, and a controlling section 45. The operating section 40 has the keyboard 5 and the display 9 and serves as a user interface with which the user inputs character information, displays various information, or the like. The print processing section 41 has the tape cartridge C, the print head 21, and a print feeding motor 26 and prints on the print tape T print images based on inputted character information while feeding the print tape T and the ink ribbon R. The cutting section 42 has the full cutter 15 and the full cutter motor 16 for driving the same and full-cuts the print tape T with print images. The detecting section 43 has various sensors such as the tape discriminating sensor 25 and performs various detections. The driving section 44 has a display driver 50, a head driver 51, a print feeding motor driver 52, and a cutter motor driver 53 and drives each section. The controlling section 45 is connected to each section and totally controls the tape printer 1.

The controlling section 45 includes a CPU 60, a ROM 61, a RAM 62, and an input controlling unit 63 (IOC: Input Output Controller), all of which are connected to one another through an internal bus 64. As described in detail below, the ROM 61 includes a control program area 68 and a control area 69. The control program area 68 stores therein control programs such as a code image creating program 70 (image creating device) for creating a two-dimensional code image 82 (QR code image) based on input data 80, an error correction rate 81, and a cell size inputted through the keyboard 5 and a font conversion program 71 for converting a print size of the created QR-code image 82 into a conversion font size 94. The control area 69 controls a character storing area 110 for storing characters (symbol, numeral, text, etc.) or the like provided in the apparatus, a font table 111 for storing a font size 94 (point, etc.) corresponding to the print size (for example, version, etc.) of the created QR-code image 82 as a table, or the like. Accordingly, the font conversion program 71 calculates the print size of the QR-code image 82 based on the QR-code image 82 created by the code image creating program 70 and requests the font size 94 corresponding to the print size with reference to the font table 111.

The RAM 62 is used as work area for a controlling process and includes a print buffer 76 or the like as an area in which created print images are temporarily stored. Furthermore, the RAM 62 can be supplied with power by a backup circuit, not shown, to keep stored data when the power of the tape printer 1 fails.

The CPU 60 receives various signals and data transmitted from each section of the tape printer 1 through the IOC 63 in accordance with the control programs stored in the ROM 61. Furthermore, the CPU 60 processes various data of the RAM 62 based on the received various signals and data and outputs the various signals and data to each section of the tape printer 1 through IOC 63, thereby performing the control of a printing process, or the like.

Furthermore, with the tape printer 1 according to the embodiment, the code image creating program 70 makes it possible to create the two-dimensional code image 82 (image data) based on creation data composed of the input data 80 and creation condition data inputted through the keyboard 5. Note that examples of the two-dimensional code include QR code, Maxi code, Veri code, data matrix, PDF 417, or the like, but a description of the embodiment will be made about a case in which, for example, the QR-code image 82 is created. The created QR-code image 82 is, as shown in FIG. 4J, of a square shape and composed of a data area 87 formed of a cell 86, position detection patterns 88 provided at three corners, and a margin area 89 surrounding the data area 87. Furthermore, examples of a parameter for setting the print size of the QR-code image 82 include the amount of the input data 80, a cell size, the error correction rate 81 (creation condition data), or the like.

The main part of the invention of the tape printer 1 is implemented by the operating section 40 and the controlling section 45. A description will be made below mainly about a user's operating procedure for controlling the tape printer 1 with reference to FIGS. 4A to 4J and 5.

First, when the power key of the keyboard 5 is pressed to turn on power, the tape printer 1 is activated in an operating state in which the user can make key entry. The tape printer 1 has a plurality of modes such as an input/edit mode 90 in which an arbitrary character string is inputted and edited, and a code image creating mode 91 in which a QR-code image 82 and a bar-code image are created. Each mode is displayed on the display screen 37 of the display 9 with prescribed key operation, and print images are each created on the input screen dedicated to each mode. On the display screen 37 of the display 9, various setting conditions or the like such as a font size 94 are indicated by a plurality of indicators 38. Note that the input/edit mode 90 is set as default at activating the tape printer 1 (see FIG. 4A).

Provided at the lower half part of the input/edit mode 90 is an image editing area 92 in which print images are inputted and edited. Provided at the upper half part thereof is a preview area 93 in which print preview images are displayed. Furthermore, displayed at the upper half part on the left side of the input/edit mode 90 are the length of a label corresponding to the print images being created and edited and the width of the print tape T detected by the tape discriminating sensor 25. At the upper marginal part of the input/edit mode 90, the plurality of indicators 38 for displaying the font size 94 to be used are arranged. Note that the font size 94 is displayed by a point (i.e., point size).

In the image editing area 92, a character string inputted through the keyboard 5 is displayed in the horizontal direction. When the character string extends over a plurality of rows, they are displayed side by side one above the other. Displayed also in the image editing area 92 are a line-head mark 95 for showing in what number of row each character string is positioned and a cursor 96 for indicating an position in which editing and inputting are performed. In the preview area 93 is displayed in reverse video the print images inputted and edited in the image editing area 92. The line-head mark 95 is also displayed in reverse video when the input data 80 is inputted. Assuming that characters of "LW," for example, are inputted through the keyboard 5, the character string of "LW" is displayed in the image editing area 92 and "LW" is displayed in reverse video in the preview area 93, respectively. Furthermore, one of the plurality of indicators 38, which corresponds to the font size 94 of the inputted characters "LW," is lit (see FIG. 4B).

Figure 4A:
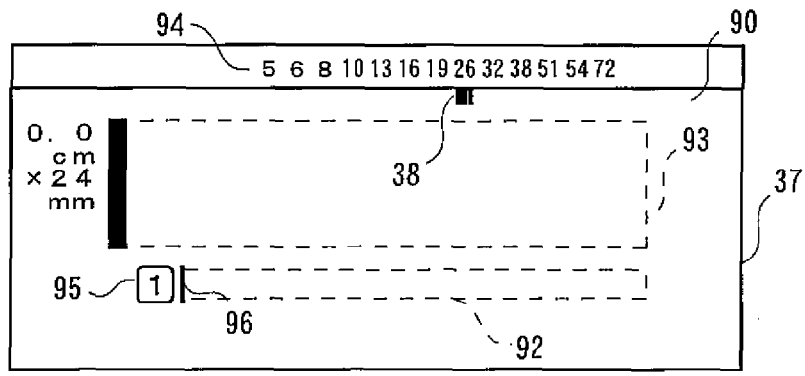
FIGS. 4A to 4D are an illustration of a display at an initial stage in which a QR-code image is created.
Figure 4B:
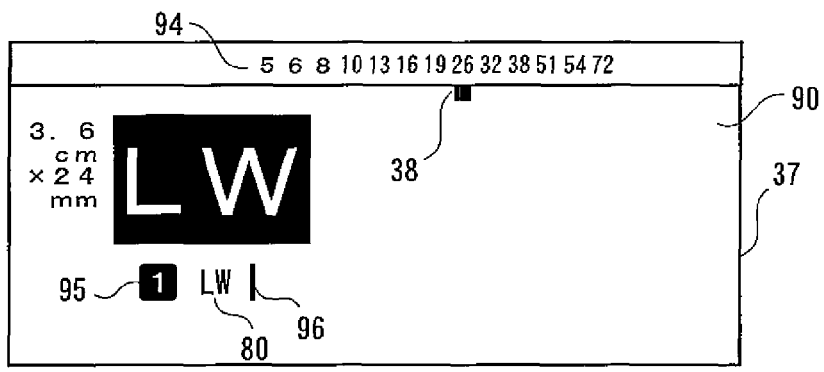
Figure 4C:
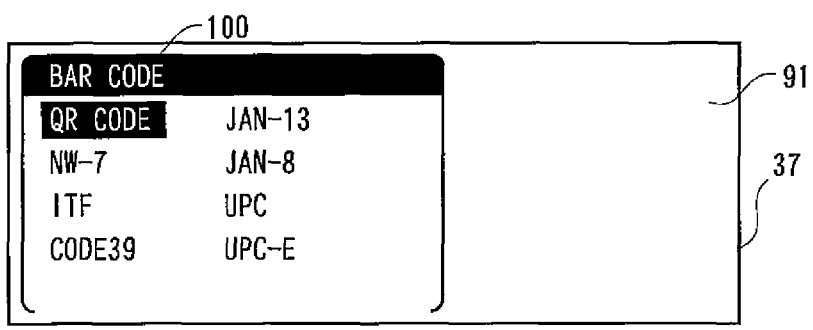
Figure 4D:
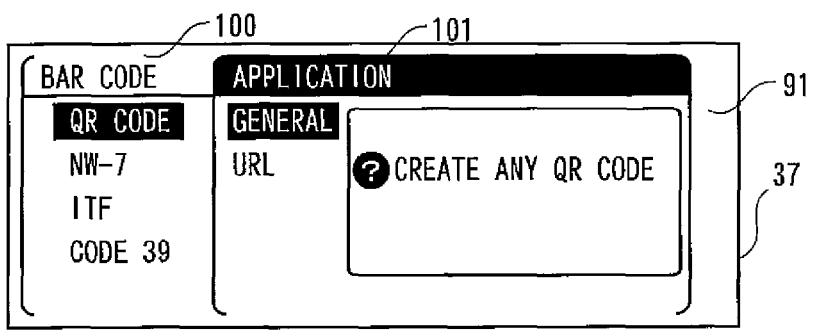
Figure 4E:
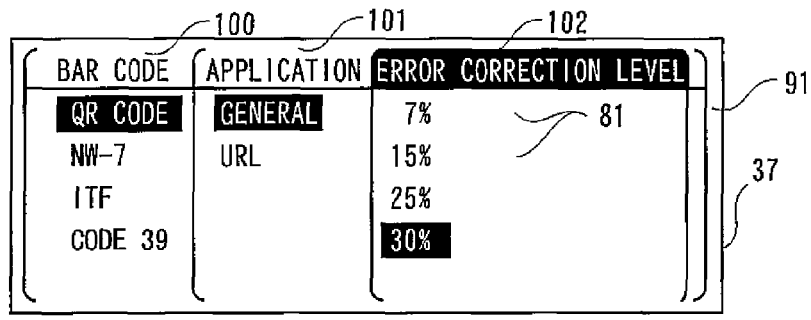
FIGS. 4E to 4H are an illustration of the display at an intermediate stage in which the QR-code image is created.

When the QR-code image 82 is created, the prescribed key operation is performed in a state in which the input/edit mode 90 is displayed, to display the code-image creating mode 91 designated to create code images (see FIG. 4C). Note that the cell size of the QR-code image 82 is previously set. On an initial screen of the displayed code-image creating mode 91 is displayed a code selection menu 100 in which a plurality of types of codes are selectively displayed. In the code selection menu 100 are displayed alternatives such as various bar codes as one dimensional code and QR code as two-dimensional code. When "QR code" is selected in this case, an application menu 101 is hierarchically displayed (see FIG. 4D).

In the application menu 101 are selectively displayed the alternatives of "GENERAL" and "URL," either of which is to be selected according to the usage of the QR-code image 82 to be created. The user can select either "GENERAL" for creating a desired character string or "URL" for creating addresses such as a Web site address. When a desired alternative is selected in the application menu 101, an error correction level menu 102 is hierarchically displayed (see FIG. 4E).

Figure 4F:
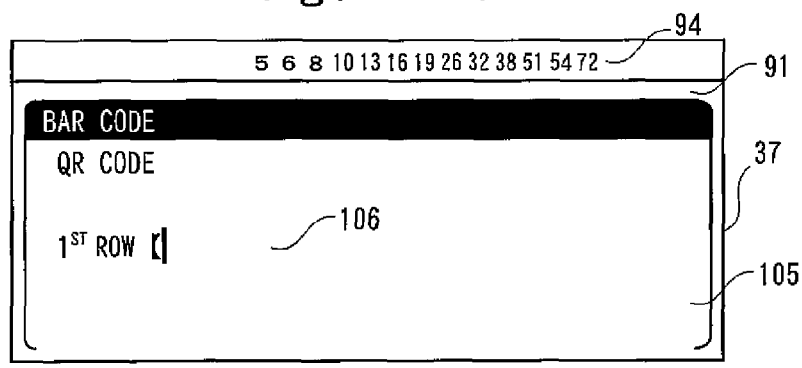
Figure 4G:
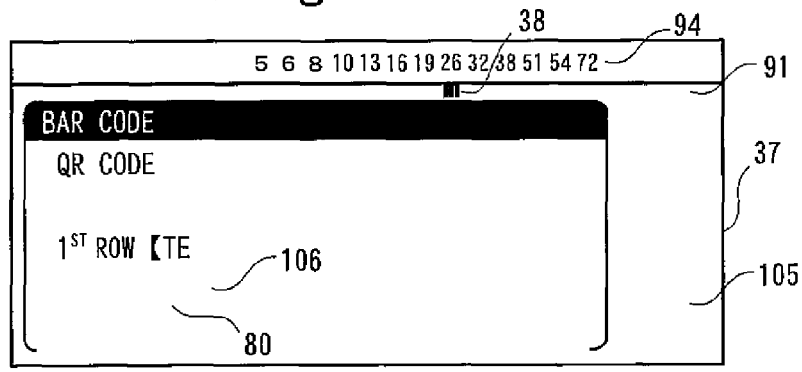
Figure 4H:
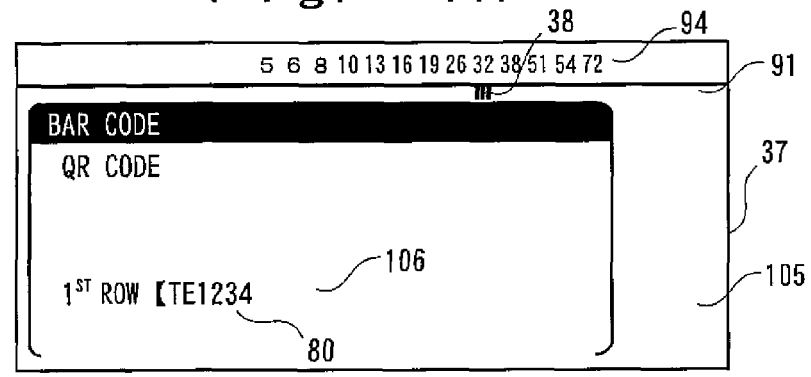
Figure 4I:
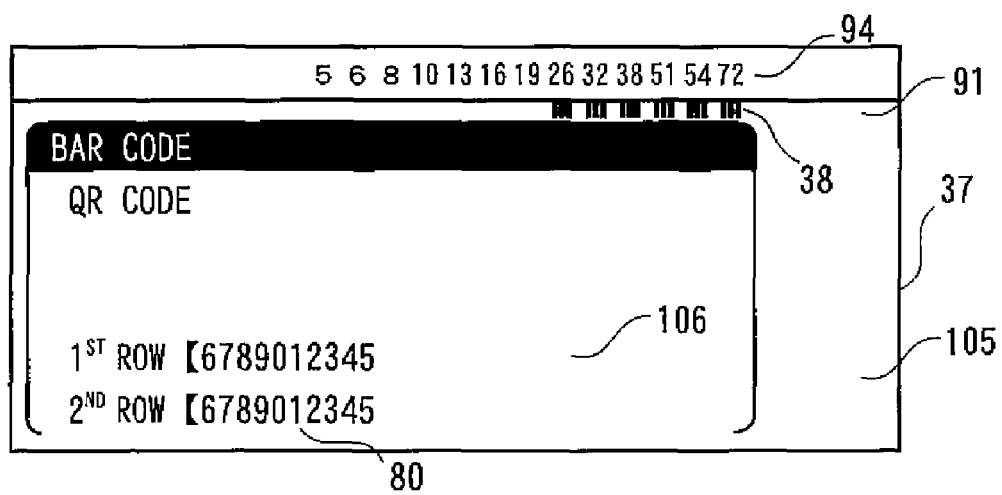
FIGS. 4I and 4J are an illustration of the display at a final stage in which the QR-code image is created.
Figure 4J:
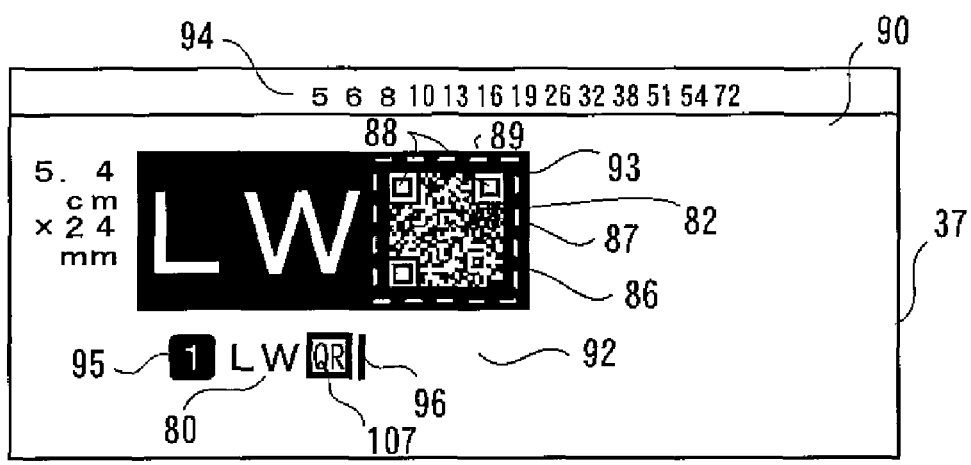

Selectively displayed in the error correction level menu 102 are the alternatives of the error correction rate 81 including "7%," "15%," "25%," and "30%." When a desired error correction rate 81 is selected, the screen then transits to a data input screen in which data to be stored in the QR-code image 82 is inputted (see FIG. 4F).

Provided at the center of the data input screen 105 is an input data displaying area 106 in which to display the input data 80 to be inputted through the keyboard 5 and stored in the QR-code image 82. Also, at the upper marginal part thereof are arranged the plurality of indicators 38 which display the print size of the created QR-code image 82 as the conversion font size 94. In other words, the plurality of indicators 38 correspond to respective font sizes 94 for each point size: the print size of the created OR-code image 82 is converted into the corresponding font size 94 with reference to the font table 111 based on the font conversion program 71 stored in the ROM 61, and the indicator 38 corresponding to the converted font size is lit and displayed as the conversion font size 94. In addition, at the left of the input data displaying area 106 is displayed the number of rows of the inputted input data 80.

In an initial state in which the input data 80 has not been inputted, the plurality of indicators 38 for informing of the font size 94 are not lit, informing that the input data 80 has not been inputted. As the input data 80 is inputted through the keyboard 5, the code image creating program 70 creates the QR-code image 82 based on the inputted input data 80 and the error correction rate (creation condition data) set in the error correction level menu 102. The input data 80 can also be inputted through prescribed key operation by reading the existing data stored in the ROM 61. The print size of the created QR-code image 82 is converted into the font size 94, and the tape printer 1 lights the indicator 38 corresponding to the conversion font size 94 (see FIG. 4G). The conversion font size 94 becomes larger as the amount of the input data 80 increases, and the tape printer 1 lights the indicator 38 corresponding to the larger conversion font size 94 (see FIG. 4H). When the amount of the input data 80 is further increased to create the QR-code image 82 whose conversion font size 94 exceeds the apparatus's maximum font size 94 stored in the tape printer 1, the plurality of indicators 38 flash on and off, informing that there are no font sizes 94 corresponding thereto (see FIG. 4I). Here, the apparatus's maximum font size 94 represents the maximum font size included in the tape printer 1. Note that, with the tape printer 1 as used in the embodiment, it is not possible to create a QR code-image 82 larger in size than the apparatus's maximum font size 94. Accordingly, it is possible for the user to create a QR-code image 82 of a printable size by adjusting the amount of the input data 80 when he/she identifies the indicators 38 flashing on and off.

When the desired input data 80 is inputted and the input data 80 inputted through prescribed key operation is determined, the QR-code image 82 is resultantly created based on the creation condition thus set as well as on the input data 80, and the screen switches to the input/edit mode 90 (see FIG. 4J). In the image editing area 92 of the switched input/edit mode 90 is displayed a QR mark 107 for showing the QR-code image 82, and in the preview area 93 thereof is displayed the QR-code image 82 of the desired print size. Note that, when the cursor 96 is positioned on the QR mark 107, the indicators 38 are displayed without lighting.

Figure 5:
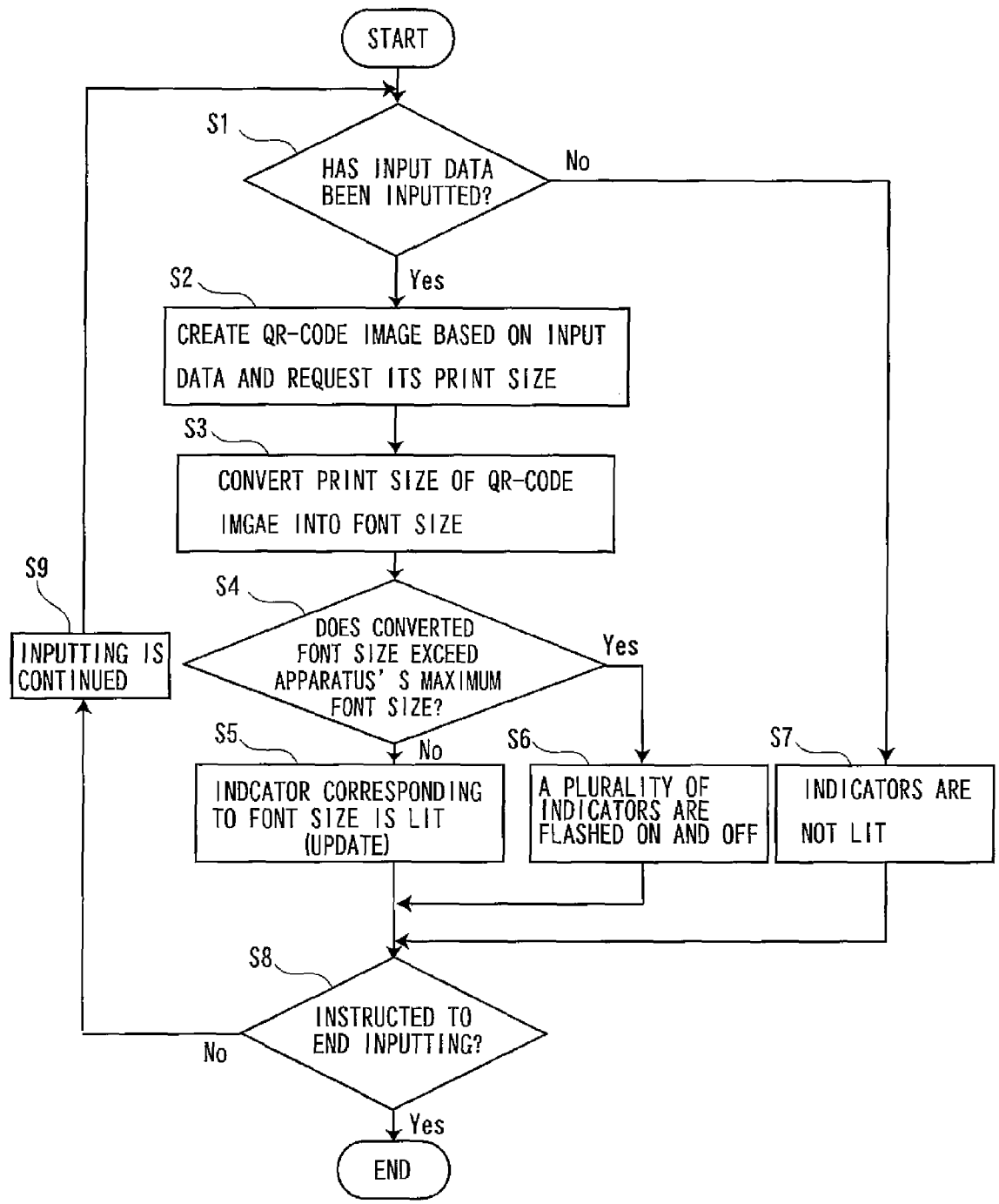
FIG. 5 is a flow chart of information by an indicator.

Next, a description will be made about an operation flow regarding information by the indicator(s) 38 with reference to a flow chart of FIG. 5. When the screen switches to the data input screen 105 from the error correction level menu 102, the tape printer 1 finds whether or not the input data 80 has been inputted on the data input screen 105 (S1). If it is found that the input data 80 has not been inputted then (S1: No), the plurality of indicators 38 on the data input screen 105 are not lit (S7). If it is found that the input data 80 has been inputted (S1: Yes), the tape printer 1 creates the QR-code image 82 based on the code image creating program 70 and requests the print size thereof (S2). Thereafter, the font conversion program 71 calculates the conversion font size 94 corresponding to the print size of the created QR-code image 82 (S3). When the calculated conversion font size 94 becomes smaller than the apparatus's maximum font size 94 stored in the tape printer 1 (S4: No), one indicator 38 corresponding to the conversion font size 94 is lit (S5). When the calculated conversion font size 94 becomes larger than the apparatus's maximum font size 94 stored in the tape printer 1 (S4: Yes), the plurality of indicators 38 (e.g., all the indicators 38 whose conversion font size exceeds the printable size) are flashed on and off (S6). Then, it is found whether or not the user has instructed to end the inputting (S8). When the user proceeds inputting the input data 80 (S8: No), the inputting is continued (S9) and the operation flow returns to S1 again. When the user instructs to end the inputting of the input data 80 (S8: Yes), the operation flow comes to an end. Note that, when a format such as "QR mobile" is called through the keyboard 5 to create a QR code for registration for a mobile phone, an existing input data (sample data) is readily available. In this case also, the operation flow is performed in the same manner as the above.

Figure 6A:
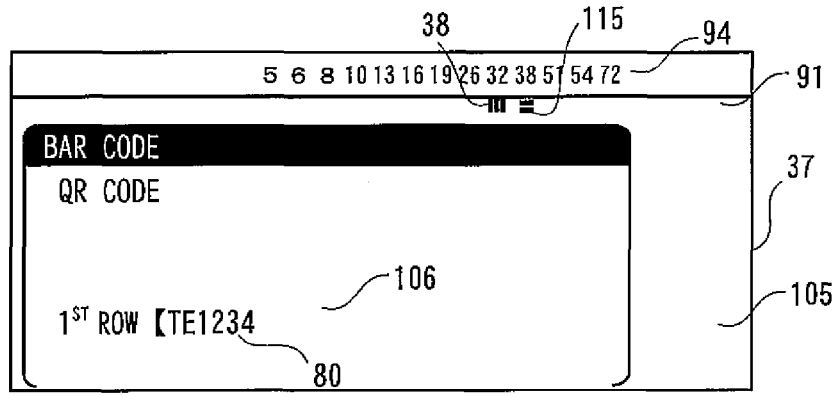
FIGS. 6A to 6C are an illustration of the display in which the QR-code image is created.
Figure 6B:
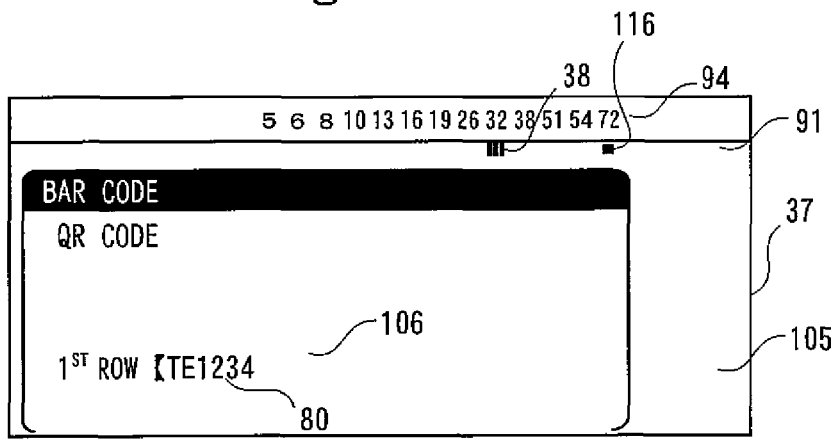
Figure 6C:
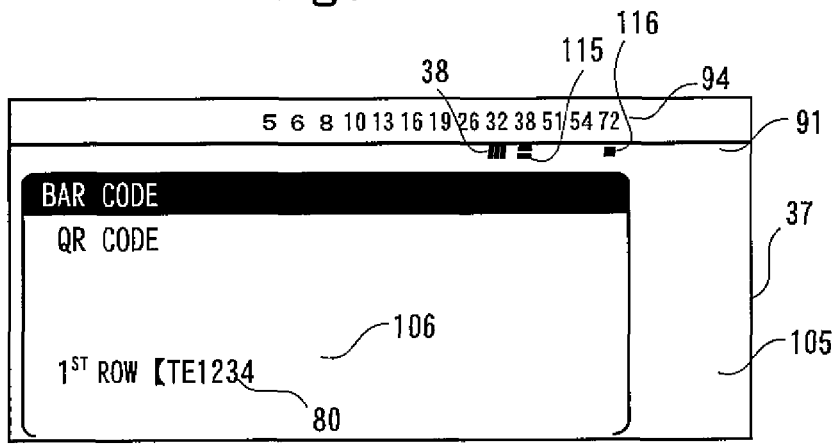

According to the above configuration, it is possible for the user to perform an inputting process of the input data 80, while identifying the print size of the QR-code image 82 created based on creation data in the process of inputting the input data 80. When the QR-code image 82 of the desired print size is to be created, the amount of the input data 80 is adjusted as needed, making it possible to efficiently create the QR-code image 82 of the desired print size. In this particular embodiment, the input data 80 is varied after the error correction rate and the cell size are set, and the print size of the QR code image 82 is subsequently varied. Note, however, that this is not the only available process. It is also possible to vary the error correction rate and/or the cell size after the input data 80 is inputted, then varying the print size of the QR code image 82. The tape printer 1 as used in this embodiment is structured to automatically inform of the print size of the two-dimensional code image in real time at each data input. Note, however, that it is also possible to make the print size informed by prescribed key operation. Further in this particular embodiment, the plurality of indicators 38 are flashed on and off when the conversion font size exceeds the apparatus's maximum font size 94. Note that it is likewise possible to make the indicators flash on and off when the conversion font size exceeds a tape width's maximum font size 94 (print object's maximum font size) in which it is possible to perform printing on a print object with the print size of the two-dimensional code image. It could also be possible to light the plurality of indicators or make them flash on and off so as to distinguish between the conversion font size and the apparatus's maximum font size, or between the conversion font size and the tape width's maximum font size. This is to say that, as shown in FIGS. 6A to 6C, it could be possible to provide an indicator 115 exclusive for the tape width's maximum font size 94 (see FIG. 6A), an indicator 116 exclusive for the apparatus's maximum font size (see FIG. 6B), or both the indicators 115 and 116 (see FIG. 6C) and light them.

What is claimed is:

1. An image creating apparatus comprising:
   an inputting device for inputting creation data composed of input data and creation condition data;
   an image creating device for creating a two-dimensional code image based on the creation data being inputted, in the process of inputting the creation data by inputting device;
   a character storage device for preliminarily storing a character;
   a font table for storing a font size corresponding to a print size of the two-dimensional code image as a table;
   a font conversion device for calculating the print size of the two-dimensional code image and converting the print size into a conversion font size with reference to the font table; and
   an informing device for informing of the font size of the two-dimensional code image being created by the image creating device, while the creation data is being inputted, wherein
   an amount of the input data is adjustable based on a result from the informing device; and
   the informing device informs of both the conversion font size and a print object's maximum font size in which it is possible to perform printing on a print object with the print size of the two-dimensional code image.

2. The image creating apparatus according to claim 1, further comprising a storing device for storing an existing creating data, wherein
   the inputting device is configured to edit the creation data read out from the storing device.

3. The image creating apparatus according to claim 1, wherein the informing device informs of both the conversion font size and an apparatus's maximum font size which is the maximum font size out of stored font sizes.

4. The image creating device according to claim 1, wherein the informing device informs that the conversion font size exceeds the apparatus's maximum font size which is the maximum font size out of the stored font sizes.

5. A printing apparatus comprising:
   the image creating apparatus according to claim 1; and
   a printing device for printing the two-dimensional code image created by the image creating apparatus.

6. The image creating apparatus according to claim 1, further comprising a display device for displaying the inputted creation data, wherein the informing device informs of the font size of the two-dimensional code image by displaying the font size on a part of the display device, while the creation data is being inputted.

7. An image creating apparatus comprising:
   an inputting device for inputting creation data composed of input data and creation condition data;
   an image creating device for creating a two-dimensional code image based on the creation data being inputted, in the process of inputting the creation data by inputting device;
   a character storage device for preliminarily storing a character;
   a font table for storing a font size corresponding to a print size of the two-dimensional code image as a table;
   a font conversion device for calculating the print size of the two-dimensional code image and converting the print size into a conversion font size with reference to the font table; and
   an informing device for informing of the font size of the two-dimensional code image being created by the image creating device, while the creation data is being inputted, wherein
   an amount of the input data is adjustable based on a result from the informing device, and
   the informing device informs that the conversion font size exceeds the print object's maximum font size in which it is possible to perform printing on a print object with the print size of the two-dimensional code image.

8. An image creating method comprising:
   inputting creation data composed of input data and creation condition data;
   creating a two-dimensional code image based on the inputted creation data in the process of inputting the creation data;
   converting a print size of the two-dimensional code image being created into a font size of a character image previously stored;
   preliminarily storing a character;
   storing a font size corresponding to a print size of the two-dimensional code image in a font table;
   calculating the print size of the two-dimensional code image and converting the print size into a conversion font size with reference to the font table; and
   informing of the font size of the two-dimensional code image being created, while the creation data is being inputted, wherein
   an amount of the input data is adjustable based on a result of the informing step, and
   the method informs of both the conversion font size and a print object's maximum font size in which it is possible to perform printing on a print object with the print size of the two-dimensional code image.

9. An image creating method comprising:
   inputting creation data composed of input data and creation condition data;
   creating a two-dimensional code image based on the inputted creation data in the process of inputting the creation data;
   converting a print size of the two-dimensional code image being created into a font size of a character image previously stored;
   preliminarily storing a character;
   storing a font size corresponding to a print size of the two-dimensional code image in a font table;
   calculating the print size of the two-dimensional code image and converting the print size into a conversion font size with reference to the font table; and
   informing of the font size of the two-dimensional code image being created, while the creation data is being inputted, wherein an amount of the input data is adjustable based on a result of the informing step, and the method informs that the conversion font size exceeds the print objects maximum font size in which it is possible to perform printing on a print object with the print size of the two-dimensional code image.

* * * * *

UNITED STATES PATENT AND TRADEMARK OFFICE
CERTIFICATE OF CORRECTION

PATENT NO. : 8,368,943 B2  
APPLICATION NO. : 11/671965  
DATED : February 5, 2013  
INVENTOR(S) : Shoji Takayama et al.

It is certified that error appears in the above-identified patent and that said Letters Patent is hereby corrected as shown below:

Title Page

Item 73, Assignee: please delete "King Jim Co., Ltd., Tokyo (JP)"

Signed and Sealed this  
Fifteenth Day of October, 2013

Teresa Stanek Rea  
*Deputy Director of the United States Patent and Trademark Office*